United States Patent Office 3,108,818
Patented Oct. 29, 1963

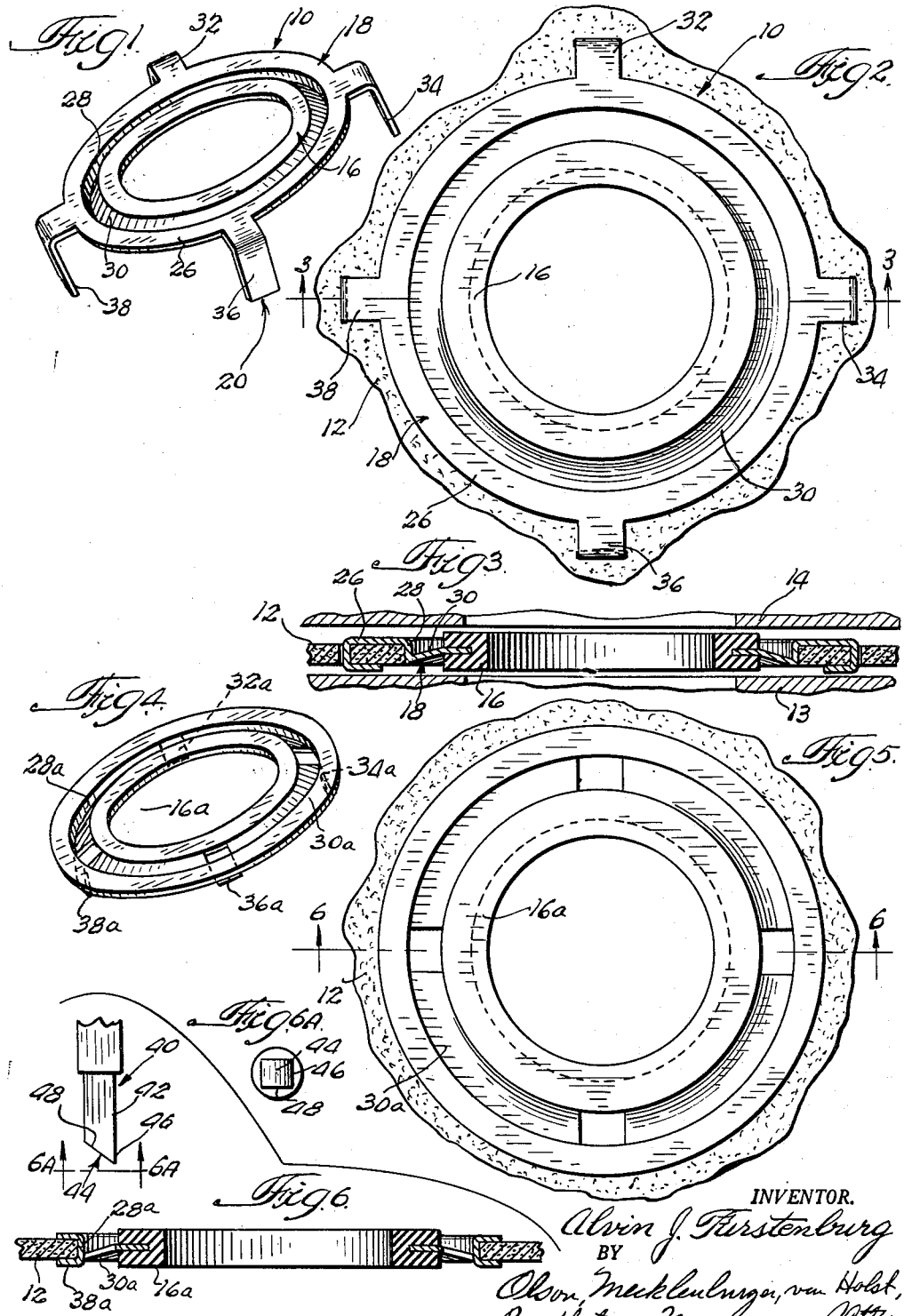

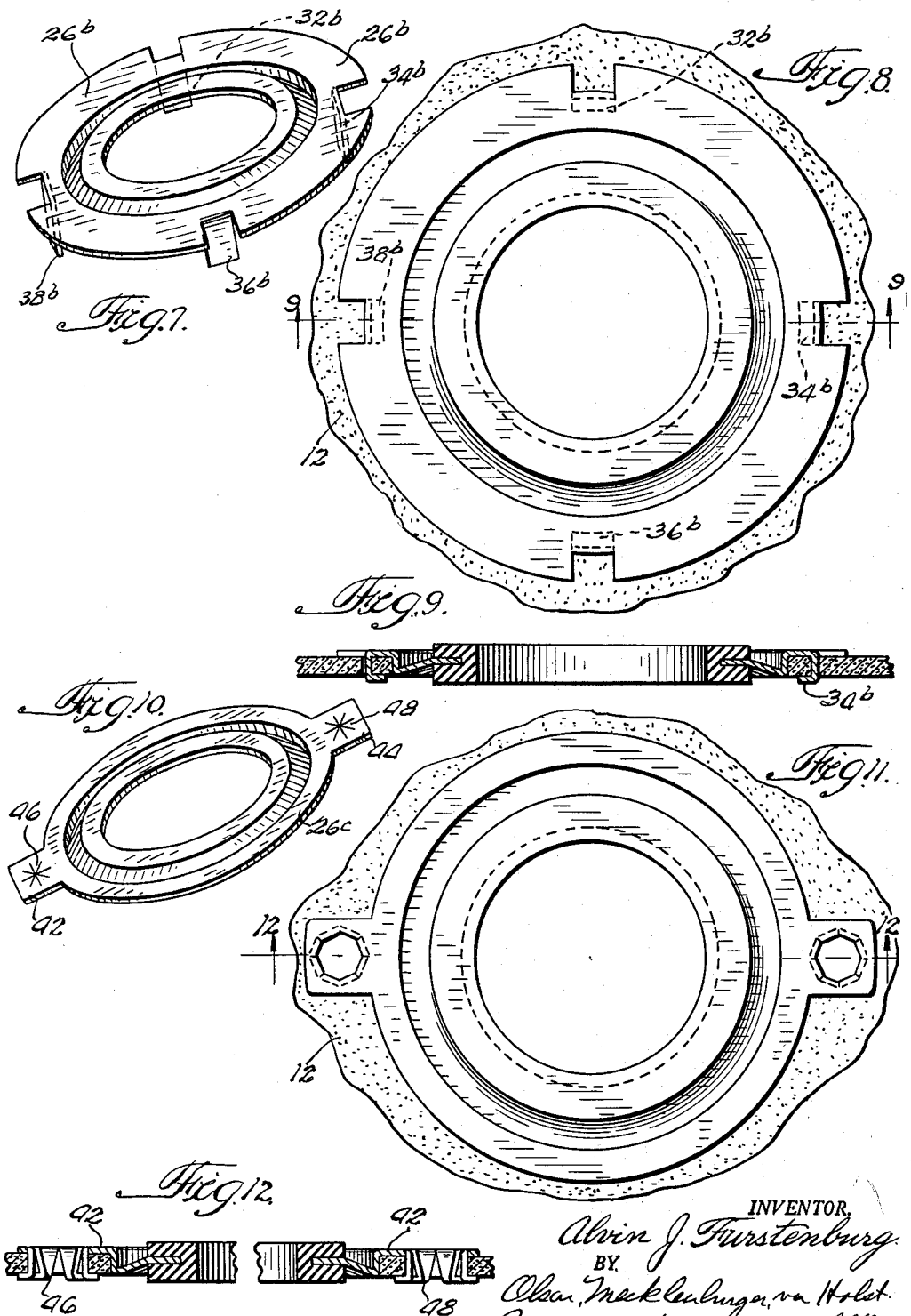

3,108,818
FLUID TRANSFER SEAL FOR GASKET
Alvin J. Furstenburg, North Riverside, Ill., assignor to Felt Products Manufacturing Co., Skokie, Ill., a corporation of Illinois
Filed Dec. 14, 1959, Ser. No. 859,475
9 Claims. (Cl. 277—189)

This invention relates to a device which may be attached to an apertured gasket to provide a fluid-containing and conducting seal through the gasket between two fluid-conducting members.

In the construction of gaskets, it is quite often necessary to provide a transfer seal between the two members which are separated by the gasket. Such a seal permits the flow of fluid between the members and acts to contain the fluid in the area of the gasket. Such seals are provided quite often in automotive head gaskets where the fluid flowing between the head and the block may be water or oil.

Head gaskets are usually very thin and therefore the fluid transfer seal must also be very thin. In addition, the seal must be inexpensive and must be capable of firm attachment to the gasket. There are presently available many different shapes of gaskets, each shape being adapted to fit a particular automobile head and block design. Although the differences between many of the gaskets may be slight, the repair garage or automotive parts store must, nevertheless, maintain a large inventory of gaskets which often differ only in the location of the fluid transfer seals therethrough.

It is one object of this invention to provide a fluid transfer seal which will contain and conduct a fluid through a gasket.

It is another object of this invention to provide a fluid transfer seal which may be quickly and easily applied to a gasket by either the manufacturer or user.

It is another object of this invention to provide an inexpensive fluid transfer seal which may be easily manufactured and easily applied to a gasket.

It is still a further object of this invention to provide a fluid transfer seal adapted for production line application to a finished gasket, which seal will provide an effective fluid conduit between two fluid-conducting members.

Other objects will be seen and a fuller understanding of the invention may be had by referring to the following description and claims taken in conjunction with the accompanying drawings.

The device constructed in accordance with this invention is adapted for use in combination with a flat apertured gasket and will provide a fluid-containing and conducting seal between two fluid-conducting members. The device includes a resilient apertured seal member and a supporting plate which is attached to and extends outwardly from the seal member. Means is provided on the supporting plate for engaging the opposite faces of the flat gasket adjacent the aperture therein such that the seal member may be held firmly in position within the gasket aperture. One of the principal features of this invention is the construction of the supporting plate and the means thereon for firmly attaching this plate to the gasket.

Another feature of this invention is the novel method of affixing the seal member to the gasket.

With reference to the drawings:

FIGURE 1 is a perspective view of a device constructed in accordance with this invention;

FIG. 2 is a top plan view of the device illustrated in FIG. 1 showing the device after it has been attached to the gasket;

FIG. 3 is a sectional elevation view of the device taken substantially along line 3—3 of FIG. 2;

FIG. 4 is a perspective view of a device constructed in accordance with this invention illustrating a slightly modified form of the gasket-attaching means;

FIG. 5 is a top plan view of the device illustrated in FIG. 4 showing the device attached to the gasket;

FIG. 6 is a sectional elevation view of the gasket device illustrated in FIGS. 4 and 5 taken substantially along line 6—6 of FIG. 5 and also illustrating a method by means of which the device may be attached to the gasket;

FIG. 6A is a view taken along line 6A—6A of FIG. 6 and showing the device which may be employed to affix the seal member to the gasket;

FIG. 7 is a perspective view of another slightly modified device constructed in accordance with this invention;

FIG. 8 is a top plan view of the device illustrated in FIG. 7 showing the device attached to a gasket;

FIG. 9 is a sectional elevation view of the device taken substantially along line 9—9 of FIG. 8;

FIG. 10 is a perspective view of an additionally modified device constructed in accordance with this invention;

FIG. 11 is a top plan view of the device illustrated in FIG. 10 showing this device attached to a gasket; and FIG. 12 is a sectional elevation view taken substantially along line 12—12 of FIG. 11.

The device 10, constructed in accordance with this invention, is adapted to be applied to an apertured gasket 12 in order to provide a fluid-containing and conducting seal between two fluid-conducting members 13 and 14 such as an automobile block and head.

The gasket 12 may be constructed of any of the well-known gasket materials and may be either a single ply or a composite. The location of the gasket aperture within which the device 10 is accommodated is determined by the design of the fluid-conducting members with which the gasket is used.

The device 10 may be attached to the gasket either after the gasket has been completely formed or during the forming operation, and it may be attached either by the manufacturer or by the user. This device includes a resilient thick-walled, substantially cylindrical seal member 16 which is preferably constructed of a resilient material such as rubber or neoprene. The height of this seal member 16 is somewhat greater than the thickness of the gasket 12 so that when positioned in the gasket aperture as hereinafter described the seal member will be resiliently compressed between members 13 and 14.

Attached to and extending outwardly from the periphery of the seal member 16 is an annular supporting plate 18. Means, preferably in the form of a plurality of integral deformable tabs 20, permit the supporting plate to be firmly attached to the gasket 12 with the resilient cylindrical seal member 16 centrally disposed within the aperture of the gasket. As will be seen, these tabs may extend from various portions of the supporting plate.

The preferred embodiment of the invention is illustrated in FIGS. 1, 2 and 3. Annular supporting plate 18 is preferably constructed of a thin malleable sheet material and is formed in such shape as will properly position and support the resilient seal member 16 substantially in the plane of the gasket 12.

As best illustrated in FIG. 3 the supporting plate 18 is embedded in and extends outwardly from the periphery of seal member 16 at approximately the midpoint thereof. The flange portion 26 of supporting plate 18 is spaced radially outward from the periphery of the seal member 16 and is connected to the seal member by means of a web, which in the preferred embodiment comprises a transverse section 28 and an oblique section 30. Oblique section 30 extends radially outwardly and downwardly from the peripheral median or center of the seal member 16 and has an outside diameter slightly less than the diameter of the hole or aperture which has been cut in the gasket and within which the seal member 16 is supported. Transverse section 28 is integral with oblique section 30 and extends upwardly from the periphery thereof to substantially define a cylinder or sleeve which will fit snugly within the gasket aperture. The cylinder defined by transverse section 28 is of greater diameter than and is preferably concentric with the cylindrical periphery of the seal member 16. The transverse section 28 is connected to the flange 26, and the latter lies flatly upon the top face of the gasket 12.

Extending radially outward from the periphery of flange 26 are four deformable tabs 32, 34, 36 and 38. These tabs are substantially L-shaped extending outwardly and thence transversely downward through slots provided in the gasket circumjacent the gasket aperture. The free ends of the tabs 32 through 38 are then formed radially inward into flat engagement with the undersurface of gasket 12.

These tab ends thus lie in a plane which is spaced from and is parallel to the plane of flange 26, and the device 10 is thus locked in position. It is to be noted that the oblique section 30 of the supporting plate extends away from flange 26 toward the opposite face of the gasket 12. The transverse cylindrical section 28 connecting the oblique section to the flange 26 is of a height substantially equal to the thickness of the gasket. This provides a very strong and rigid support for the seal member within the gasket aperture.

The seal member is maintained in its position substantially in the plane of the gasket 12, and any tendency for this member to assume any other position within the gasket aperture is prevented by the supporting plate structure. Inasmuch as the transverse and oblique sections 28 and 30 fit snugly within the gasket aperture, the seal member is automatically centered therein.

In the embodiment illustrated in FIGS. 4, 5, and 6 the tabs 32a, 34a, 36a and 38a are struck from the oblique section 30a. In this embodiment it is not necessary to precut slots in the gasket circumjacent the gasket aperture. The tabs 32a through 38a extend downwardly from the cylindrical transverse section 28a and are formed radially outward into flat engagement with the underside of gasket 12. The seal member and the supporting plate are thus locked in position on the gasket with the seal member 16a disposed substantially in the plane of the gasket. As will be hereinafter explained, the tabs may be struck from the oblique section 30a and flatly formed under the gasket in a single operation by means of a punch 40.

In the embodiment illustrated in FIGS. 7, 8 and 9 the tabs 32b, 34b, 36b and 38b are struck from annular flange 26b and extend through slots in the gasket circumjacent the gasket aperture. The ends of these tabs are then formed radially inward into flat contact with the underside of the gasket 12 and the device is rigidly attached in its proper position.

In the embodiment illustrated in FIGS. 10, 11 and 12 two extensions 42 and 44 are connected to and project radially outward in opposite directions from flange 26c.

A plurality of tabs 46 and 48 are struck from extensions 42 and 44 respectively. The tabs 46 and 48 are formed in an annulus and extend downwardly from the plane of extensions 42 and 44 respectively to form a polygon. In FIG. 11 an octagon is formed and as may be seen, the shape actually approaches that of a cylinder. These tabs extend through two holes which have been cut in the gasket on opposite sides of the gasket aperture. The ends of the tabs are formed under the gasket and thus the device is locked tightly in place.

The oppositely disposed holes in the gasket 12 are thus in effect grommeted and lined by the extension therethrough of the tabs 46 and 48. These holes may conveniently correspond with connecting bolt holes in the two fluid-containing and conducting members with which the gasket is employed, or they may perform other useful and well-known functions.

It will be apparent that the device in any of the illustrated embodiments may be attached quickly and easily either at the time the gasket is initially formed or at some later time by the gasket user. The structure of the supporting plate maintains the fluid-conducting seal in proper position within the gasket aperture.

One particular advantageous method of applying the device to a gasket is illustrated in FIG. 6. As previously described the embodiment illustrated in FIG. 6 does not require the punching of additional slots or holes in the gasket circumjacent the gasket aperture. In order to apply this device to a gasket, the device is automatically centered in the gasket aperture by the close fit of the cylindrical transverse section 28a. The tab 38a is then cut by means of a punch 40 which simultaneously forms these tabs radially outward into contact with the underside of the gasket 12a locking the seal member and supporting plate in position.

Punch 40 has a cutting and forming tooth 42 which is substantially rectangular in cross section. This tooth has an oblique front face 44 and a forward cutting edge 46. The punch is oriented such that when it is brought into contact with the oblique section 30a of the supporting plate the forward cutting edge 46 will engage this section and begin the cut adjacent resilient seal member 16a. As the punch 40 is further depressed the oblique section 30a will be cut by the lateral edge portions 48 of the tooth as they come in contact with this section. Simultaneously with this cutting action, the oblique front face 44 of the cutting tooth forms the tab portions back under the aperture defining portions of the gasket 12. When the punch has been fully depressed, the tabs not only will have been cut, but they will have been formed into latching engagement with the gasket.

Although the invention has been described with a certain degree of particularity, it is understood that the present disclosure has been made only by way of example and that many modifications and changes in various details may be resorted to without departing from the spirit and scope of the invention, as hereinafter claimed.

What is claimed is:

1. A device for use in combination with a flat apertured gasket to provide a fluid-containing and conducting seal between two fluid-conducting members, said device comprising a resilient apertured seal member, the external dimensions of which are substantially less than the dimensions of the gasket aperture, a supporting plate surrounding said seal member, said plate having a planar flange portion adapted to flatly engage one face of the gasket adjacent the gasket aperture and a web portion integral with said flange portion, said web portion being joined to and extending generally radially outward from said seal member, the section of said web portion adjacent the juncture with said flange portion being formed into a transverse sleeve the external dimensions of which are approximately equal to the dimensions of the gasket aperture, and tab portions struck from said supporting plate extending transverse to the plane of said flange portion and adapted to extend to and be formed into flat engagement with the opposite face of the gasket adjacent the gasket aperture, whereby said seal member may be held firmly in position within the gasket aperture.

2. The structure of claim 1 in which said tab portions are substantially L-shaped extending outwardly substantially in the plane of said flange portions and thence transverse to said plane.

3. The structure of claim 1 in which said tab portions are struck from said flange portion.

4. The structure of claim 1 in which said tab portions are struck from said web portion.

5. The structure of claim 1 in which said flange portion has a plurality of substantially coplanar outward extensions from which said tabs are struck.

6. The structure of claim 5 in which a plurality of tabs are struck from each extension, said tabs substantially defining a polygon, the axis of which is transverse to the plane of said flange portion and the extensions thereof.

7. A device for use in combination with a flat, apertured gasket to provide a fluid-containing and conducting seal between two fluid-conducting members, said device comprising a resilient seal member and a supporting plate circumjacent said seal member, said plate having a planar flange portion adapted to flatly engage one face of the gasket adjacent the gasket aperture, a web portion connecting said flange portion to said seal member, and tab portions integral with said web and flange portions and extending transverse to the plane of said flange portion and adapted to extend to and be formed into flat engagement with the opposite face of the gasket adjacent the gasket aperture, whereby said seal member may be held firmly in position within the gasket aperture, said web portion extending transversely from adjacent the juncture with said flange portion a distance approximately equal to the thickness of the gasket and extending obliquely therefrom inwardly, the innermost extremities of said web portion being embedded in said seal member at approximately the peripheral center line thereof.

8. The method of affixing to an apertured gasket a resilient apertured seal member having an attached, circumjacent malleable metal supporting plate, which method comprises positioning said seal member within the gasket aperture with portions of the metal supporting plate overlying the aperture defining portions of the gasket, cutting a plurality of tabs into the portion of said plate overlying the gasket aperture and simultaneously forming the tabs under the aperture defining portions of the gasket thereby locking the seal member and supporting plate in position.

9. In combination with a flat apertured gasket, a device for providing a fluid containing and conducting seal between two fluid conducting members, said device comprising a resilient apertured seal member, the diameter of which is substantially less than the diameter of the gasket aperture, a supporting plate joined to said seal member and extending radially outward therefrom to adjacent the aperture defining portions of the gasket, and tabs integral with said supporting plate and extending radially outward therefrom beyond the limits of the aperture and into superposed engaged relationship with the parallel and opposed exterior faces of the flat gasket circumjacent the gasket aperture, whereby said seal member may be firmly held in position within the gasket aperture.

References Cited in the file of this patent

UNITED STATES PATENTS

| | | |
|---|---|---|
| 1,628,858 | Shawk | May 17, 1927 |
| 1,654,061 | Wheeler et al. | Dec. 27, 1927 |
| 1,829,248 | Victor | Oct. 27, 1931 |
| 2,160,598 | Melrath | May 30, 1939 |
| 2,283,674 | Geyer | May 19, 1942 |
| 2,655,393 | Cobb | Oct. 13, 1953 |
| 2,681,241 | Aukers | June 15, 1954 |